(12) United States Patent
Odet et al.

(10) Patent No.: US 10,947,039 B2
(45) Date of Patent: Mar. 16, 2021

(54) DISCHARGE VALVE

(71) Applicant: Tetra Laval Holdings & Finance S.A., Pully (CH)

(72) Inventors: Frédéric Odet, La May sur Evre (FR); Blandine Malecot, Beaupréau (FR); Florent Lorry, St André de la Marche (FR)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 16/470,656

(22) PCT Filed: Nov. 23, 2017

(86) PCT No.: PCT/EP2017/080138
§ 371 (c)(1),
(2) Date: Jun. 18, 2019

(87) PCT Pub. No.: WO2018/114199
PCT Pub. Date: Jun. 28, 2018

(65) Prior Publication Data
US 2019/0389655 A1    Dec. 26, 2019

(30) Foreign Application Priority Data

Dec. 21, 2016 (EP) .................... 16206032

(51) Int. Cl.
*B65D 90/62* (2006.01)
*F16K 1/20* (2006.01)
(Continued)

(52) U.S. Cl.
CPC .......... *B65D 90/623* (2013.01); *F16K 1/2057* (2013.01); *B65G 65/40* (2013.01); *F16K 27/0227* (2013.01)

(58) Field of Classification Search
CPC ..... B65D 90/623; B65D 65/40; F16K 1/2057; F16K 27/0227; F16K 1/20
(Continued)

(56) References Cited

U.S. PATENT DOCUMENTS 2,818,195 A    12/1957  Scarlett
3,494,589 A *  2/1970  Mumma ............. F16K 31/1635
                                                        251/298
(Continued)

FOREIGN PATENT DOCUMENTS

DE    43 38 012 C1    3/1995
JP    H07 156991 A    6/1995
(Continued)

OTHER PUBLICATIONS

International Search Report for corresponding Application No. PCT/EP2017/080138, dated Feb. 6, 2018.
(Continued)

*Primary Examiner* — Lien M Ngo
(74) *Attorney, Agent, or Firm* — Renner, Otto, Boisselle & Sklar, LLP

(57) ABSTRACT

A discharge valve for discharging a food product may be arranged at a low point of a vessel. The discharge valve includes a valve body, a valve seat, a valve plug and an arm. The valve plug is attached to a first end of the arm and a second end of the arm is attached to a pivot point that is arranged inside the valve body. The arm is configured to pivot the valve plug between a valve closed position where the valve plug abuts the valve seat, and a valve open position where the valve plug is pivoted away from the valve seat, to a location where the valve plug is positioned at least partly within the valve body.

16 Claims, 4 Drawing Sheets

(51) Int. Cl.
*B65G 65/40* (2006.01)
*F16K 27/02* (2006.01)

(58) Field of Classification Search
USPC ....... 222/508, 521, 533, 534, 517, 516, 545,
222/548, 549, 550, 556, 557, 185.1, 186,
222/182, 181.3, 625; 251/84–88,
251/298–301, 357–359; 105/280–284
See application file for complete search history.

(56) References Cited

U.S. PATENT DOCUMENTS

| | | | | | |
|---|---|---|---|---|---|
| 3,542,255 | A | * | 11/1970 | Oetiker | B65G 53/4691 |
| | | | | | 222/445 |
| 3,997,089 | A | * | 12/1976 | Clarke | B60P 1/56 |
| | | | | | 222/545 |
| 4,033,549 | A | * | 7/1977 | Stamer | F16K 1/2028 |
| | | | | | 251/86 |
| 4,249,679 | A | * | 2/1981 | Dillman | E01C 19/10 |
| | | | | | 137/246.22 |
| 4,308,894 | A | * | 1/1982 | Carpentier | F16K 15/03 |
| | | | | | 137/630.15 |
| 4,498,492 | A | * | 2/1985 | Carpentier | F16K 1/2028 |
| | | | | | 137/315.16 |
| 5,676,170 | A | | 10/1997 | Wurth | |
| 6,206,024 | B1 | * | 3/2001 | Naberhaus | F16K 5/0642 |
| | | | | | 137/15.24 |
| 6,343,618 | B1 | * | 2/2002 | Britt | F16K 15/035 |
| | | | | | 137/527 |
| 7,568,496 | B2 | * | 8/2009 | Kraenzle | F16L 41/16 |
| | | | | | 137/454.2 |
| 10,646,839 | B2 | * | 5/2020 | Dorr | B01F 9/10 |

FOREIGN PATENT DOCUMENTS

| | | |
|---|---|---|
| JP | 2016 088672 A | 5/2016 |
| LU | 88 205 A1 | 9/1994 |

OTHER PUBLICATIONS

Extended European Search Report for corresponding Application No. 16206032.1, dated May 31, 2017.

* cited by examiner

DISCHARGE VALVE

TECHNICAL FIELD

The invention relates to a discharge valve configured to be arranged at a low point of a vessel for discharging a food product from the vessel.

BACKGROUND ART

In the food industry one of the most essential and most common types of components are vessels that hold food products. The vessels are typically used to hold food products of various characters. For example, the food products may be of a more or less liquid character or have a dry and powdery character.

Needless to say, during a typical process of manufacturing a food product it is at various points in time necessary to empty a vessel of its food product content, i.e. discharging the food product from the vessel. Discharging is often performed by aid of gravity in such a manner that a discharge valve, located at a low point of the vessel, is opened whereupon any food product contained in the vessel rushes downwards and out of the vessel.

One type of prior art discharge systems involves the use of a rectangular hatch operating as a valve. However, such systems with rectangular hatches have various drawbacks. For example, rectangular discharge hatches are prone to leaking. Furthermore, a large rectangular discharge hatch may cause de-mixing of a food product, if the vessel is a vessel that is configured to mix various ingredients. Also, a rectangular discharge hatch may require a specific hopper to receive discharged food product. Rectangular discharge hatches are also typically very difficult to clean because of various difficulties regarding access.

Another type of prior art discharge systems involves the use of so-called segment ball valves. Such discharge valves are, however, also associated with various drawbacks. For example, a segment ball valve comprises a plug that enters the vessel when opening. In case the vessel is a vessel wherein various food ingredients are being mixed by paddles, complicated automated solutions to manage opening conditions are necessary since there is a high risk of contact between the valve plug and mixer paddles. Also, segment ball discharge valves are difficult to access when, e.g., cleaning of the vessel is necessary.

SUMMARY

It is an object of the invention to at least partly overcome one or more of the above-identified limitations of the prior art related to discharge of a food product from a vessel. In particular, it is an object to enable discharge of a food product from a vessel while avoiding interference with the inside of the vessel.

Such an object is achieved as disclosed herein in a first aspect by a discharge valve that is configured to be arranged at a low point of a vessel. The discharge valve is used for discharging a food product from the vessel and the valve comprises a valve body, a valve seat, a valve plug and an arm. The valve plug is attached to a first end of the arm and a second end of the arm is attached to a pivot point that is arranged inside the valve body. The arm is configured to pivot the valve plug between a valve closed position, where the valve plug abuts the valve seat, and a valve open position where the valve plug is pivoted away from the valve seat to a location where the valve plug is positioned at least partly within the valve body.

In other words, such a discharge valve comprises a plug that opens into the discharge valve body by means of the pivoting arm. Thereby it is possible to avoid any interference with the inside of the vessel in that no part of the discharge valve need to enter the vessel when the discharge valve is opened.

In a second aspect there is provided a vessel that comprises a discharge valve as summarized above and in a third aspect there is provided a method of operating a vessel, as will be described in more detail below.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1A:
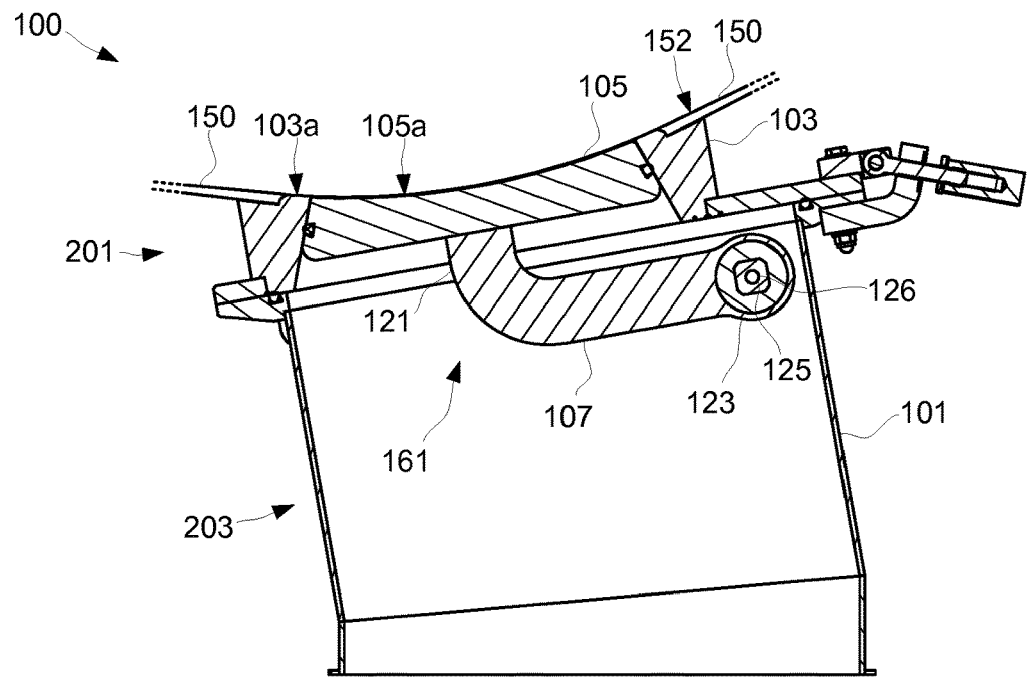
FIGS. 1a and 1b are cross-sectional views of a discharge valve in a closed and open configuration, respectively.
Figure 1B:
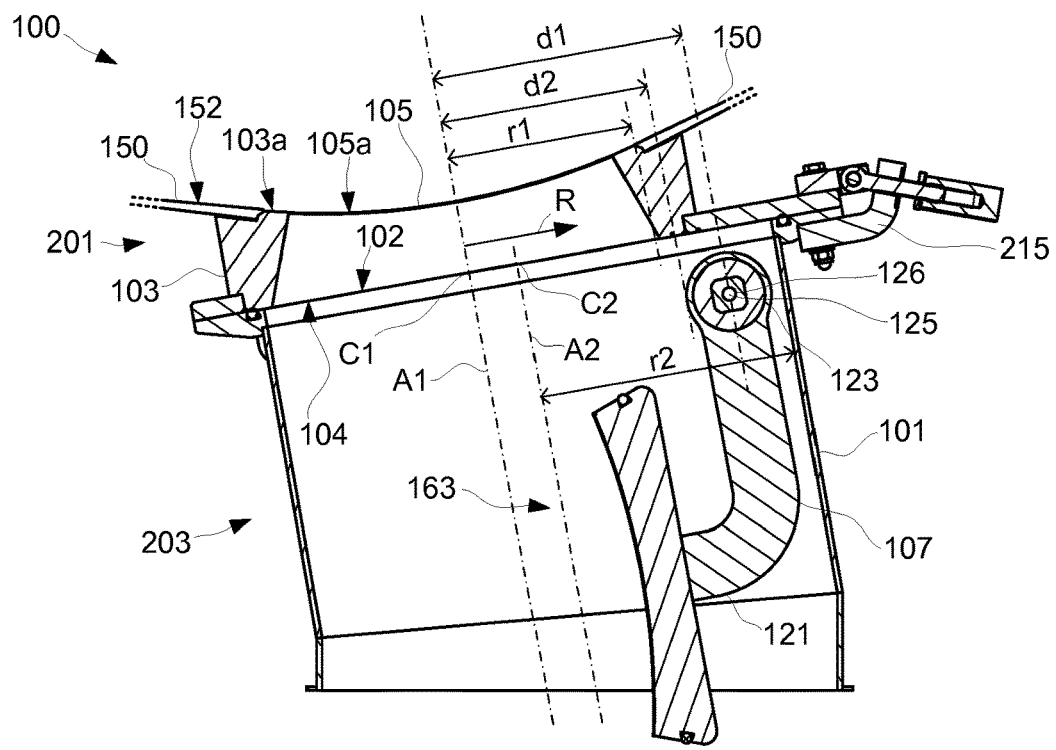

With reference to FIGS. 1a-b, 2a-b, 3a-b and FIG. 4 a discharge valve 100 that is configured to be arranged at a low point 451 of a vessel 400 is illustrated. The discharge valve 100 is arranged to discharge a food product 404 from the vessel 400.

The discharge valve 100 comprises a valve body 101, a valve seat 103, a valve plug 105 and an arm 107. The valve plug 105 is attached to a first end 121 of the arm 107 and a second end 123 of the arm 107 is attached to a pivot point 125 that is arranged inside the valve body 101. The arm 107 is configured to pivot the valve plug 105 between a valve closed position, where the valve plug 105 abuts the valve seat 103, the valve closed position being indicated by reference numeral 161 in FIG. 1a, and a valve open position where the valve plug 105 is pivoted away from the valve seat 103, to a location where the valve plug 105 is positioned at least partly within the valve body 101, the valve open position being indicated by reference numeral 163 in FIG. 1b.

The valve seat 103 may comprise a circular seat outlet 104 that has a seat outlet centre C1, a seat outlet radius r1 and faces the valve body 101. That is, the valve seat 103 may have a circular opening that has a radius that increases in the direction towards the valve body 101, much like the cross-section of a truncated cone. The circularity of the seat outlet 104 is at least implied by the fact that the plug 105 is shown as being circular in FIG. 2b. The pivot point 125 may be located, as seen in a radial direction R of the circular seat outlet 104, at a distance d1 from the seat outlet centre C1. The distance d1 is greater than the seat outlet radius r1.

Every part of the second end 123 of the arm 107 that is attached to the pivot point 125 may be located, as seen in the radial direction R of the circular seat outlet 104, at a distance d2 from the seat outlet centre C1. Also the distance d2 is greater than the seat outlet radius r1.

The valve body 101 may comprise a circular body inlet 102 that has a body inlet centre C2, a body inlet radius r2. This body inlet 102 may face the seat outlet 104, the body inlet radius r2 being larger than the seat outlet radius r1 and the body inlet centre C2 being offset from the seat outlet centre C1 in the radial direction R of the circular seat outlet 104 and towards the pivot point 125.

A first geometrical axis A1 extends through the seat outlet centre C1, and a second geometrical axis A2 extends through the body inlet centre C2.

The fact that the valve plug 105 and the valve seat 103 may have a circular character together with the fact that the valve plug 105 may be pivoted to the open position 163 inside the valve body 101, has an effect that a full circular opening may be created that minimizes a problem of demixing of ingredients inside the vessel 300. It also makes cleaning easier.

A first part 201 of the discharge valve 100 may be configured to be fixedly attached to a bottom wall 150 of the vessel 400. A second part 203 may be releaseingly attached to the first part 201. A swing arm 302 (see FIGS. 3a and 3b) may be connected to the second part 203 and support the second part 203 when the second part 203 is released from the first part 201. In such embodiments, the first part 201 may comprise the valve seat 103 and the second part 203 may comprise the body 101, the valve plug 105 and the arm 107. Moreover, it is to be understood that the term "releaseingly" in this context means "having the ability to be removed from being attached to" and it does not necessarily imply any further constructional detail in addition to those described herein. Separating in a destructive manner, e.g. by cutting in the discharge valve 100, cannot be understood as "releasing".

Embodiments that include the swing arm 302, as described above, enables fast and easy access to the vessel 400 and the discharge valve 100 itself, which in turn makes cleaning procedures fast and easy.

Figure 2A:
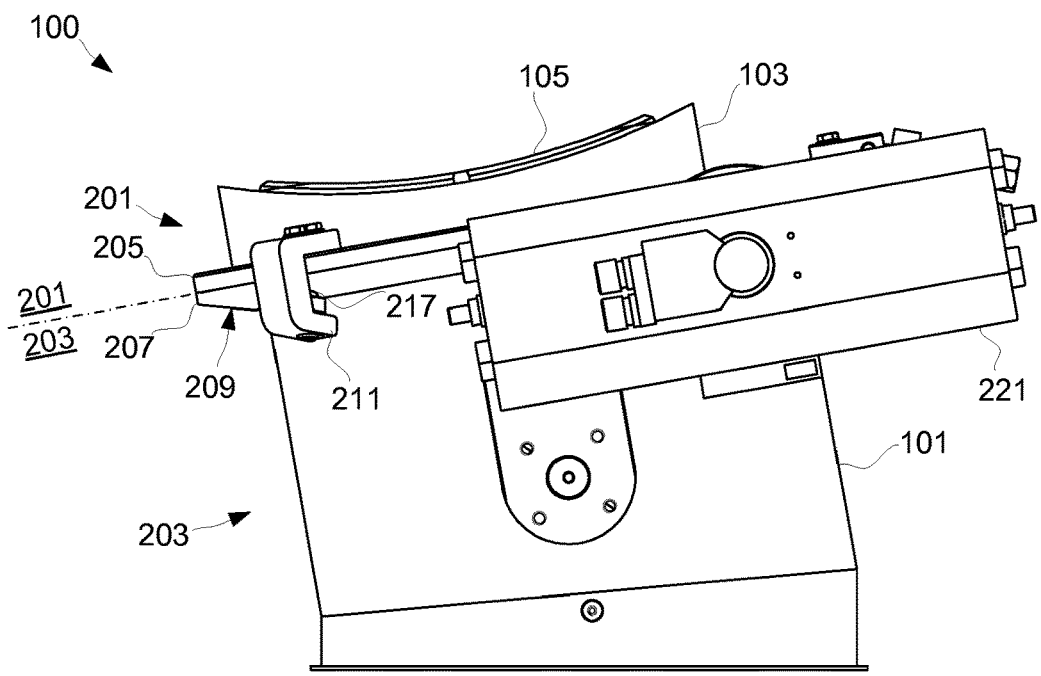
FIGS. 2a and 2b are side and top views, respectively, of the discharge valve in FIGS. 1a and 1b, FIGS. 3a and 3b are top views of the discharge valve in FIGS. 1a, 1b, 2a and 2b in a respective configuration illustrating first and second parts of the discharge valve being attached and released from each other.
Figure 2B:
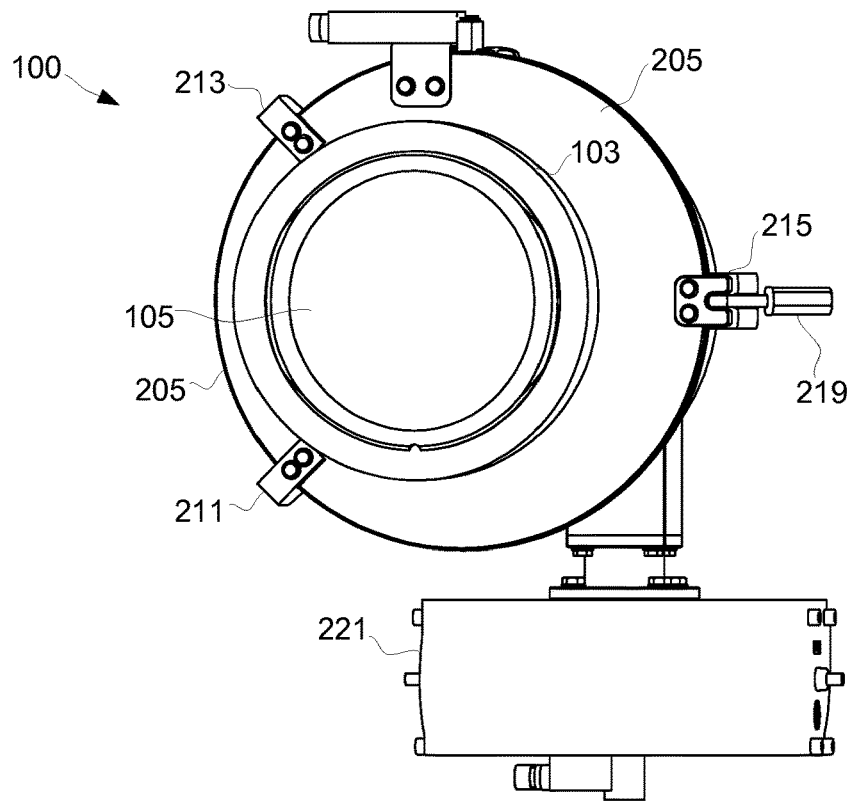

The first part 201 of the discharge valve 100 may comprise a first part flange 205 and the second part 203 of the discharge valve 100 may comprise a second part flange 207 (see FIGS. 2a and 2b). The discharge valve 100 may also comprise a bracket 211 and a clamp arrangement 215 that are configured to attach respectively release the second part flange 207 and the first part flange 205 to respectively from each other. As exemplified, the discharge valve 100 may also comprise a second bracket 213 that may operate in conjunction with the bracket 211 and the clamp arrangement 215. Moreover, the clamp arrangement 215 may comprise a locking screw 219 for enabling easy locking and unlocking of the clamp arrangement 215.

The first part flange 205 has a circular shape with a diameter that is larger than the diameter of the seat outlet 104, i.e. the first part flange radius is larger than the seat outlet radius r1. Also, a centre of the first part flange 205 is offset from the seat outlet centre C1, in the radial direction R of the circular seat outlet 104 and towards the pivot point 125.

The valve seat 103 may have a circular shape. The first part flange 205 may have a circular shape that is larger than, parallel to and, in its radial direction, offset from the circular shape of the valve seat 103.

The second part flange 207 may comprise an inclined outer surface 209 and the bracket 211 may comprise a resilient element 217 configured to impose a force on this inclined outer surface 209 of the second part flange 207. Such a configuration of the second part flange 207 and the bracket 211 is advantageous for attaching the second part flange 207 to the first part flange 205. The second bracket 213 may also comprise such a resilient element.

The valve plug 105 may comprise a concave surface 105a (see FIG. 1a) configured to, when the valve plug 105 is in the valve closed position 161, face an inner space 402 of the vessel 400 on which the valve 100 is arranged.

An upper surface 105a of the valve plug 105 may be, when the arm 107 is in the valve closed position 161 (see FIG. 1a), flush with an upper surface 103a of the valve seat 103. Moreover, this upper surface 103a of the valve seat 103 may be configured to be flush with an inner surface 152 of the bottom wall 150 of the vessel 400.

The fact that each of the upper surface 105a of the valve plug 105 and the upper surface 103a of the valve seat 103 may be flush with the inner surface 152 of the vessel 400 is advantageous in that no so-called dead-zone is created above the valve plug 105. Prior art arrangements often suffer from such a dead-zone in which material may be trapped and, e.g., affect a mixing process going on inside the vessel, as well as affect cleaning of the vessel.

The pivot point 125 may be an axle 126 that penetrates the body 101 and this axle 126 may be configured to be rotated by an actuator 221 (see FIG. 2b) located outside the body 101.

Figure 4:
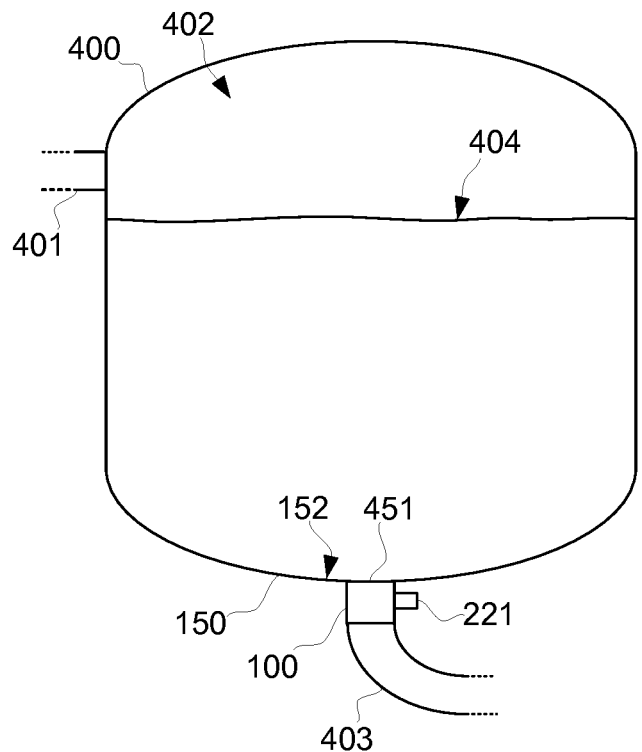
FIG. 4 illustrates a vessel comprising the discharge valve of FIGS. 1-3.

As illustrated in FIG. 4, an embodiment of the vessel 400 comprises a discharge valve 100 as described above.

Figure 3A:
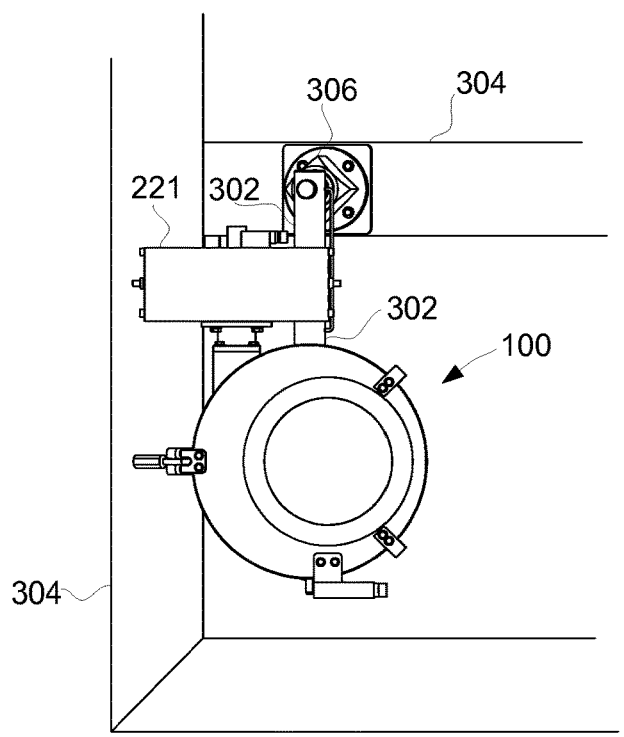
Figure 3B:
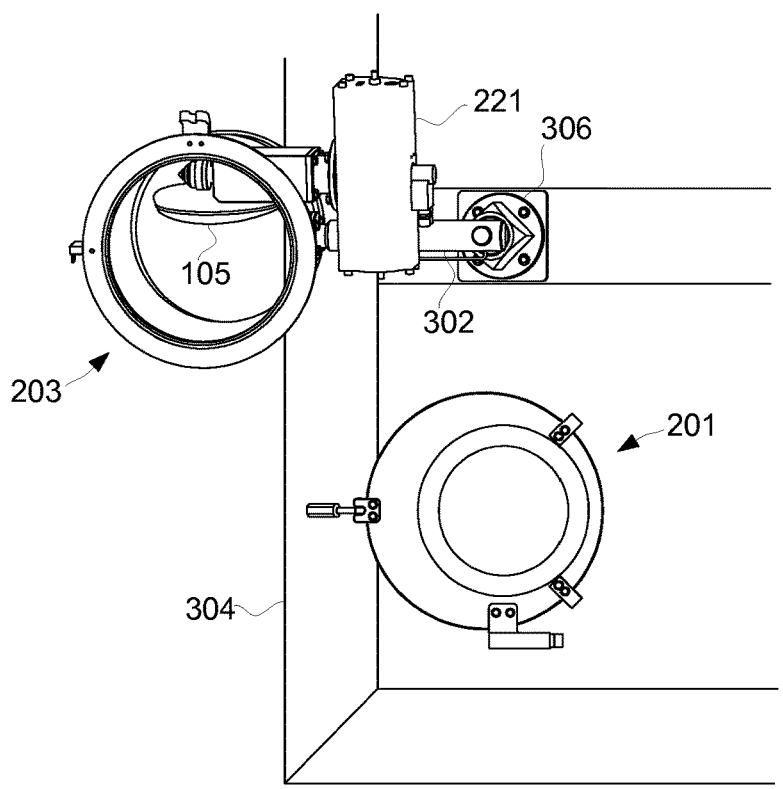

With reference to the discharge valve 100 as illustrated in FIG. 3a and FIG. 3b, the vessel 400 may comprise a discharge valve having the first part 201, the second part 203 and the swing arm 302. The swing arm 302 may in such an embodiment be connected to a support structure 304 that is fix in relation to the vessel 400. Thereby, the swing arm 302 may guide a movement of the second part 203 relative the vessel 400. The fixation may be accomplished by firmly attaching both the support structure 304 and the vessel 400 to the ground, or by attaching the support structure 304 to a peripheral surface of the vessel 400.

The vessel 400 may comprise the inner space 402, and the food product 404 that is located inside this inner space 402 and the discharge valve 100 may be arranged to discharge the food product 404 when the arm 107 is in the valve open position 163. The food product 404 may be a food product in powder form, such as milk power, infant formula, whey powder or any other diary based food powder.

An inlet pipe 401 is connected to the vessel 400 such that the food product 404 can be conveyed into the vessel 400. A outlet pipe 403 is connected to the second part 203 of the discharge valve 100, such that the food product may be conveyed away from the vessel 400 via the discharge valve 100.

Figure 5:
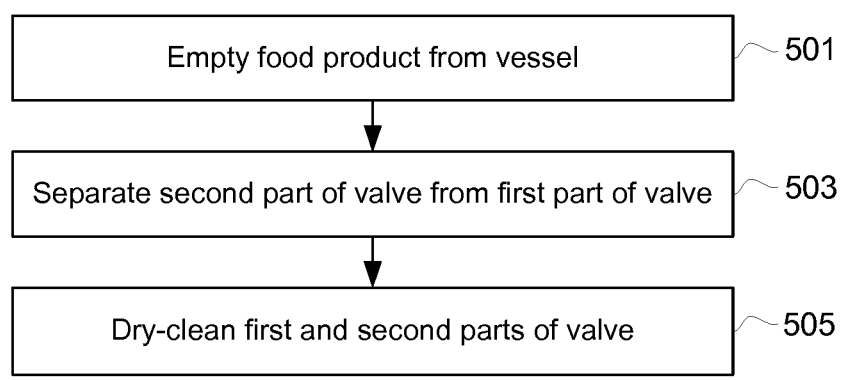
FIG. 5 is a flowchart of a method of operating the vessel illustrated in FIG. 4.

Turning now to FIG. 5, a method of operating a vessel 400 as described above in connection with FIG. 3a and FIG. 3b will be described. In this embodiment, the food product 404 has the form of powder. The method comprises emptying 501 the food product 404 from the vessel 400. The second part 203 of the discharge valve 100 may thereafter be separated 503 from the first part 201 of the discharge valve 100, whereupon the first part 201 and the second part 203 of the discharge valve 100 is dry-cleaned 505. The dry-cleaning may be accomplished by pressurized air, and by a dry or slightly moist cloth.

As indicated above, the use of the swing arm 302 to separate the second part 203 of the discharge valve 100 from the first part 201 of the discharge valve 100, enables fast and easy access to the vessel 400 and the discharge valve 100 itself, which means that such a procedure involving cleaning is fast and easy.

The valve is typically made of stainless steel, or by any other material suitable for food applications. The valve may include one or more gaskets for improving its sealing properties, such as a gasket that is located between the valve plug and the valve seat, and a gasket that is located between the first and second parts.

From the description above follows that, although various embodiments of the invention have been described and shown, the invention is not restricted thereto, but may also be embodied in other ways within the scope of the subject-matter defined in the following claims.

The invention claimed is:

1. A discharge valve configured to be arranged at a low point of a vessel for discharging a food product from the vessel, the valve comprising a valve body, a valve seat, a valve plug, and an arm, wherein:
the valve plug is attached to a first end of the arm,
a second end of the arm is attached to a pivot point,
the pivot point is arranged inside the valve body, and
the arm is configured to pivot the valve plug between
a valve closed position where the valve plug abuts the valve seat, and
a valve open position where the valve plug is pivoted away from the valve seat, to a location where the valve plug is positioned at least partly within the valve body, wherein the discharge valve comprises
a first part configured to be fixedly attached to a bottom wall of the vessel,
a second part that is releaseingly attached to the first part and connected to the arm, and
a swing arm that is connected to the second part and supports the second part when the second part is released from the first part, the swing arm being configured to carry the second part for movement of the second part relative to the vessel, the second part being configured to carry the arm during the movement of the second part.

2. The valve according to claim 1, wherein the valve seat comprises a circular seat outlet that has a seat outlet center, a seat outlet radius and faces the valve body, and
the pivot point is located, as seen in a radial direction of the circular seat outlet, at a distance from the seat outlet center that is greater than the seat outlet radius.

3. The valve according to claim 2, wherein every part of the second end of the arm that is attached to the pivot point is located, as seen in the radial direction of the circular seat outlet, at a distance from the seat outlet center that is greater than the seat outlet radius.

4. The valve according to claim 2, wherein the valve body comprises a circular body inlet that has a body inlet center, a body inlet radius and faces the seat outlet,
the body inlet radius is larger than the seat outlet radius, and
the body inlet center is offset from the seat outlet center, in the radial direction of the circular seat outlet and towards the pivot point.

5. The valve according to claim 1, wherein
the first part comprises a first part flange,
the second part comprises a second part flange, and
the valve comprises a bracket and a clamp arrangement that are configured to attach respectively release the second part flange and the first part flange to respectively from each other.

6. The valve according to claim 5, wherein
the valve seat has a circular shape, and
the first part flange has a circular shape that is
larger than
parallel to, and
in its radial direction, offset from the circular shape of the valve seat.

7. The valve according to claim 5, wherein
the second part flange comprises an inclined outer surface,
the bracket comprises a resilient element configured to impose a force on the inclined outer surface of the second part flange, for attaching the second part flange to the first part flange.

8. The valve according to claim 1, wherein the valve plug comprises a concave surface that is configured to, when the valve plug is in the valve closed position, face an inner space of the vessel on which the valve is arranged.

9. The valve according to claim 1, wherein
an upper surface of the valve plug is, when the arm is in the valve closed position, flush with an upper surface of the valve seat, and
the upper surface of the valve seat is configured to be flush with an inner surface of the bottom wall of the vessel.

10. The valve according to claim 1, wherein
the pivot point is an axle that penetrates the body,
the axle is configured to be rotated by an actuator located outside the body.

11. A vessel comprising a discharge valve according to claim 1.

12. A vessel comprising
a discharge valve according to claim 1, wherein
the swing arm is connected to a support structure that is fixed in relation to the vessel.

13. The vessel according to claim 11, comprising
an inner space, and
a food product that is located in the inner space, wherein the discharge valve is arranged to discharge the food product when the arm is in the valve open position.

14. A method of operating a vessel according to claim 13, the food product having the form of powder, the method comprising
emptying the food product from the vessel,
separating the second part of the discharge valve from the first part of the discharge valve, and
dry-cleaning the first part and the second part of the discharge valve.

15. The valve according to claim 1, wherein the first part comprises the valve seat and the second part comprises the valve body.

16. A The valve according to claim 1,
wherein when in the valve closed position, the valve plug is positioned outside the valve body and abuts the valve seat at a location that is outside the valve body, and
wherein when in the valve open position, the valve plug is pivoted away from the valve seat, to a location where the valve plug is positioned at least partly within the valve body.

* * * * *